United States Patent
Krishnan et al.

(10) Patent No.: US 6,197,854 B1
(45) Date of Patent: Mar. 6, 2001

(54) POLYCARBONATE COMPOSITION RESISTANT TO GAMMA RADIATION

(75) Inventors: Sivaram Krishnan, Pittsburgh, PA (US); Wolfgang Ebert, Krefeld (DE)

(73) Assignees: Bayer Corporation, Pittsburgh, PA (US); Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/541,570

(22) Filed: Apr. 3, 2000

(51) Int. Cl.⁷ ............................. C08K 5/45; C08K 5/15
(52) U.S. Cl. ............................ 524/111; 524/84
(58) Field of Search ...................... 524/84, 111

(56) References Cited

U.S. PATENT DOCUMENTS

| | | | |
|---|---|---|---|
| 4,338,244 | 7/1982 | Hinsken et al. | 524/109 |
| 4,624,972 | 11/1986 | Nace | 523/136 |
| 4,804,692 | 2/1989 | Lundy et al. | 523/137 |
| 4,874,802 | 10/1989 | Lundy et al. | 524/94 |
| 4,963,598 | 10/1990 | Krishnan et al. | 523/137 |
| 5,006,572 | 4/1991 | Lundy et al. | 523/136 |
| 5,175,312 | 12/1992 | Dubs et al. | 549/307 |
| 5,187,208 | 2/1993 | Rodenhouse | 523/136 |
| 5,187,211 | 2/1993 | Lundy et al. | 524/107 |
| 5,214,078 | 5/1993 | Powell et al. | 523/136 |
| 5,274,009 | 12/1993 | Grigo et al. | 523/137 |
| 5,607,624 | 3/1997 | Nesvadba et al. | 252/589 |

*Primary Examiner*—Kriellion Sanders
(74) *Attorney, Agent, or Firm*—Joseph C. Gil; Aron Preis

(57) ABSTRACT

A thermoplastic polycarbonate molding composition having improved resistance to gamma radiation-induced yellowing is disclosed. Particularly suitable for the manufacture of devices targeted for medical applications, the composition contains additive amounts of a first stabilizing compound conforming structurally to

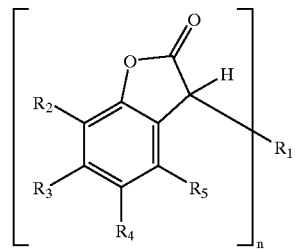

(I)

wherein in the embodiment where n is 1, $R_1$ is an unsubstituted or substituted carbocyclic or heterocyclic aromatic ring system, and where in the embodiment where n is 2, $R_1$ is unsubstituted or $C_{1-4}$-alkyl or hydroxy substituted phenylene or naphthylene, and $R_2$, $R_3$, $R_4$ and $R_5$ independently of one another are hydrogen, $C_{1-25}$-alkyl groups or phenyl.

and a saccharine compound.

10 Claims, No Drawings

POLYCARBONATE COMPOSITION RESISTANT TO GAMMA RADIATION

The invention is directed to thermoplastic molding compositions and more particularly to polycarbonate molding compositions having improved resistance to gamma radiation-induced yellowing.

SUMMARY OF THE INVENTION

A thermoplastic polycarbonate molding composition having improved resistance to yellowing that is induced upon exposure to gamma radiation is disclosed. Particularly suitable for the manufacture of devices geared for medical applications, the composition contains (i) polycarbonate resin,
(ii) 0.01 to 1.0 percent of a first stabilizer, the molecular structure of which features at least one benzofuran-2-one group per molecular chain and
(iii) 0.01 to 1.0 percent of saccharine, the percents being relative to the weight of the resin.

BACKGROUND OF THE INVENTION

Because of their physical and mechanical properties, polycarbonate resins were found to be eminently suitable for a variety of applications in the medical field. However, those applications which require sterilization by exposure to ionizing radiation present a problem since polycarbonate tends to yellow and show increased haze. The relevant art is noted to include U.S. Pat. Nos. 4,624,972; 5,187,211; 4,804,692; 4,963,598; 4,874,802; 5,006,572; 5,187,208; 5,274,009 and 5,214,078 all of which relate to polycarbonate compositions rendered resistant to gamma radiation by the incorporation of a stabilizing agent.

Also presently relevant is U.S. Pat. No. 4,325,863 which disclosed benzofuranone compound useful as stabilizer for organic materials. The organic polymeric materials stabilized by this compound are said to include polycarbonates and polyamides as well as copolymers of styrene and acrylonitrile. Also presently relevant is U.S. Pat. No. 4,338,244 which disclosed benzofuran(2)one to be a useful stabilizer for organic materials. Polycarbonates, polyamides and SAN copolymers are mentioned among the many resins said to be stabilized by the incorporation of this compound. Also relevant are U.S. Pat. Nos. 5,175,312 and 5,607,624 which disclosed 3-phenyl-3H-benzofuran-2-ones and 3-arylbenzofuranones respectively, said to be suitable as stabilizing agents for organic materials against oxidative, thermal or light induced degradation. Lastly, U.S. patent applications Ser. Nos. 09/268,115 and 09/270,860, assigned to Bayer Corporation.

Saccharine has been disclosed as a stabilizer of polycarbonate compositions in WO 98/58996 (PCT/EP98/03425).

DETAILED DESCRIPTION OF THE INVENTION

The thermoplastic composition in accordance with the present invention comprises a polycarbonate resin and about 0.01 to 1.0, preferably 0.01 to 0.75, percent, relative to the weight of the polycarbonate, of a first stabilizing compound and 0.01 to 1.0, preferably 0.01 to 0.75 percent of saccharine, the percents being relative to the weight of the resin.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 15,000 to 80,000 and their melt flow rate, per ASTM D-1238 at 300° C., is about 1 to about 95 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

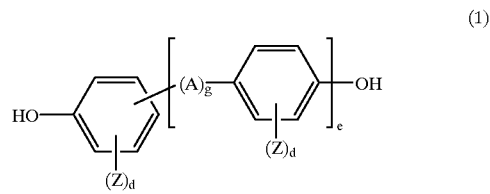

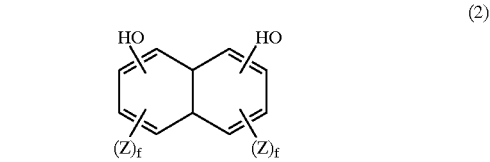

wherein
A denotes an alkylene group with 1 to 8 carbon atoms, an alkylidene 20 group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

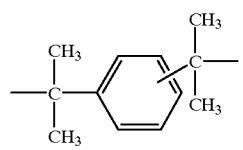

e and g both denote the number 0 to 1;
Z denotes F, Cl, Br or C$_1$–C$_4$-alkyl and if several Z radicals are substituents in one aryl radical, they may be identical or different from one another;
d denotes an integer from 0 to 4; and
f denotes an integer from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, dihydroxydiphenyl cycloalkanes, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,227,458; 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxy-phenyl)-propane (bisphenol A), 2,4-bis-(4- hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, a bis-(3,5-dimethyl-4-hydroxyphenyl)-p-diisopropylbenzene, 4,4'-sulfonyl diphenol and 1,1-bis-(4-hydroxyphenyl)-3,3,5-trimethylcyclohexane.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention is phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxy compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxy compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene.

Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon 2400, Makrolon 2600, Makrolon 2800 and Makrolon 3100 resins, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. Especially suitable is Makrolon 2500 having MFR value of 14 to 17 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The structure of the first stabilizer contains at least one benzofuran-2-one group per molecule. This compound conforms structurally to

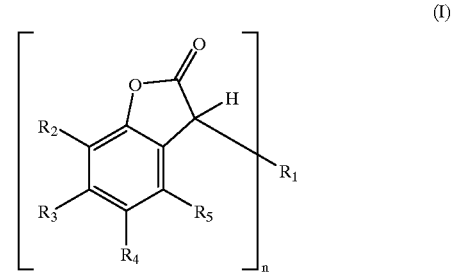

(I)

wherein in the embodiment where n is 1, $R_1$ is an unsubstituted or substituted carbocyclic or heterocyclic aromatic ring system, and where in the embodiment where n is 2, $R_1$ is unsubstituted or $C_{1-4}$-alkyl or hydroxy substituted phenylene or naphthylene, and $R_2$, $R_3$, $R_4$ and $R_5$ independently of one another are hydrogen, $C_{1-25}$-alkyl groups or phenyl.

A preferred compound is represented by 5,7-di-tertiary-butyl-3-(3,4 di-methylphenyl)-3H-benzofuran-2-one which is depicted as:

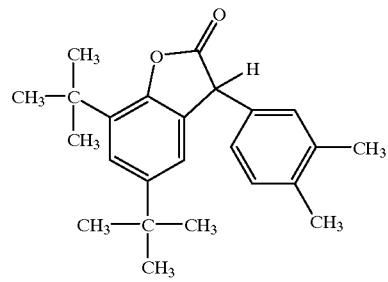

Detailed description of suitable compounds and their preparation may be found in U.S. Pat. Nos. 4,325,863, 5,175,312 and 5,607,624, which are incorporated by reference herein. Suitable compounds are available in commerce from Ciba Specialty Chemicals Limited as Hrganox®HP 136. Preferably, the stabilizer suitable in the context of the invention melts at a temperature equal to or lower than the melt temperature of polycarbonate. This characteristic enables the compounding of the stabilizer with the polycarbonate resin in their molten state.

Saccharine, useful in the context of the invention, is a well known substance that is widely commercially available. See, for example, Rompp Chemie, $6^{th}$ Edition, S.3952, or the relevant entry in Ullman, $4^{th}$ Edition, Volume 22, 5 357 and U.S. Pat. No. 2,667,503 incorporated herein by reference. Saccharine which conforms structurally to

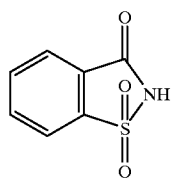

as well as its derivatives (herein "saccharine compound") are suitable. Saccharine compounds include N-methyl; N-ethyl; N-i/n propyl-; N-iso/normal/neo/tertiary butyl-; N-normal/iso-pentyl-; N-cyclohexyl-; N-cyclopentyl-, N-phenyl-, and N-benzyl derivatives of saccharine. Preferred are saccharine, N-methyl and N-benzyl saccharine. Most preferred are saccharine and N-methyl as well as N-phenyl saccharine.

Preferably, the useful saccharine is free from alkali ion contaminants, and it should not contain more than 100 ppm of alkali ions.

The stabilizers of the invention are added to the polycarbonate in an amount sufficient to improve the resistance of the composition against yellowing that is induced by exposure to gamma radiation.

Conventional additives may also be incorporated in the composition for their art-recognized utility. These include dyes, flame retardants, release agents, plasticizers, thermal, hydrolytic and UV stabilizers, antioxidants, fillers, reinforcements and the like. Among the useful thermal stabilizers are hindered phenols, phosphines, phosphites and phosphonites which may advantageously be added to the stabilized composition of the invention.

The invention is further illustrated but is not intended to be limited by the following examples in which all parts and percentages are by weight unless otherwise specified.

The preparation of the stabilized compositions of the invention is conventional.

Experimental

Compositions in accordance with the invention were prepared and their properties determined. In the compositions described below: Example 1 entails an unstabilized homopolycarbonate resin based on bisphenol A having a weight average molecular weight of about 30,000.

The first and/or second stabilizing compounds that were used in the experiments reported below were as follows:

Stabilizer I—5,7-di-tertiary-butyl-3-(3,4 di-methylphenyl)-3H-benzofuran-2-one.

Stabilizer II—sachharine conforming to

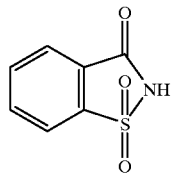

These stabilizers were incorporated in polycarbonate resin as described above at amounts indicated in the table below and test specimens were injection molded following conventional procedures. The test specimens were evaluated as to their yellowness indices (YI) in accordance with the procedures described in ASTM E 313. The YI values were determined before irradiation—$YI_0$—(Hunter Lab. Equipment) and the test specimens were then irradiated (Co bomb; dose 3 Mrad—Table 1; 5 Mrad—Table 2). The irradiated specimens were stored for 10 days in the dark and the YI w, as then again determined—$YI_{10}$. The difference between $YI_0$ and $YI_{10}$, is referred to below as $\Delta YI$.

TABLE 1

| 3 Megarad Exposure Components | Example 1 | Example 2 | Example 3 | Example 4 | Example 5 | Example 6 |
| --- | --- | --- | --- | --- | --- | --- |
| Polycarbonate, wt. % | 100 | 99.5 | 99.5 | 99.5 | 99.25 | 99.25 |
| Stabilizer, wt. % | 0 | 0.5 | 0 | 0.25 | 0.5 | 0.25 |
| Stabilizer II, wt % | 0 | 0 | 0.5 | 0.25 | 0.25 | 0.5 |
| $YI_0$ | 4.2 | 4.2 | 3.6 | 4.6 | 6.0 | 7.4 |
| $YI_{10}$ | 28.2 | 22.8 | 19.6 | 20.0 | 20.2 | 15.5 |
| $\Delta YI$ | 24.00 | 18.6 | 16.0 | 15.4 | 14.2 | 8.1 |

TABLE 2

| 5 Megarad Exposure Components | Example 1 | Example 2 | Example 3 | Example 4 | Example 5 | Example 6 |
| --- | --- | --- | --- | --- | --- | --- |
| Polycarbonate, wt. % | 100 | 99.5 | 99.5 | 99.5 | 99.25 | 99.25 |
| Stabilizer, wt. % | 0 | 0.5 | 0 | 0.25 | 0.5 | 0.25 |
| Stabilizer II, wt % | 0 | 0 | 0.5 | 0.25 | 0.25 | 0.5 |
| $YI_0$ | 4.2 | 4.2 | 3.6 | 4.6 | 6.0 | 7.4 |
| $YI_{10}$ | 51.9 | 35.8 | 36.0 | 35.0 | 31.8 | 30.0 |
| $\Delta YI$ | 47.7 | 31.6 | 32.4 | 30.6 | 25.8 | 22.6 |

The lowered values of $\Delta YI$ point to a synergistic stabilization resulting from the combination of stabilizing compounds in the context of polycarbonate.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. A thermoplastic molding composition comprising a polycarbonate resin and
   (i) about 0.01 to 1.0% of a stabilizer conforming structurally to

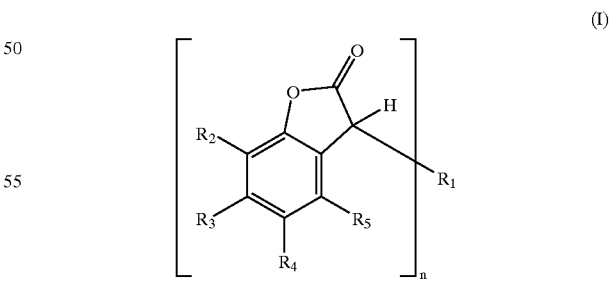

(I)

wherein in the embodiment where n is 1, $R_1$ is an unsubstituted or substituted carbocyclic or heterocyclic aromatic ring system, and where in the embodiment where n is 2, $R_1$ is unsubstituted or $C_{1-4}$-alkyl or hydroxy substituted phenylene or naphthylene, and $R_2$, $R_3$, $R_4$ and $R_5$ independently of one another are hydrogen, $C_{1-25}$-alkyl groups or phenyl. and (ii) about 0.01 to 1% of a saccharine compound.

2. The thermoplastic molding composition of claim 1 wherein said (i) is 5,7-di-tertiary-butyl-3-(3,4 di-methylphenyl)-3H-benzofuran-2-one.

3. The thermoplastic molding composition of claim 1 wherein said polycarbonate has a weight average molecular weight of 15,000 to 80,000.

4. The thermoplastic molding composition of claim 1 wherein polycarbonate is derived from at least one member selected from the group consisting of dihydroxy compounds conforming to structural formulae (1) and (2)

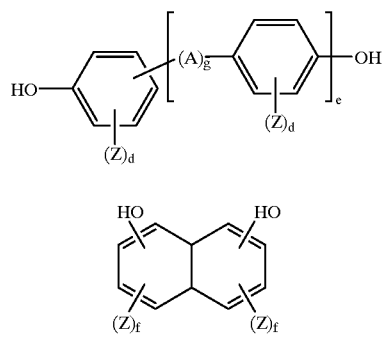

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$ or a radical conforming to

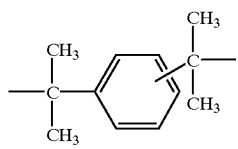

e and g both denote the number 0 to 1;
Z denotes F, Cl, Br or $C_1$–$C_4$-alkyl and if several Z radicals are substituents in one aryl radical, they may be identical or different from one another;
d denotes an integer from 0 to 4; and
f denotes an integer from 0 to 3.

5. The thermoplastic molding composition of claim 1 wherein polycarbonate is derived from at least one member selected from the group consisting of 2,2-bis-(4-hydroxyphenyl)-propane, 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene, 4,4'-sulfonyl diphenol and 1,1-bis-(4-hydroxyphenyl)-3,3,5-trimethylcyclohexane.

6. The thermoplastic molding composition of claim 1 wherein polycarbonate is a homopolymer derived from 2,2-bis-(4-hydroxyphenyl)-propane.

7. The thermoplastic molding composition of claim 1 wherein said saccharine compound conforms to

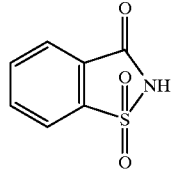

8. The thermoplastic molding composition of claim 1 wherein said saccharine compound is at least one member selected from the group consisting of N-methyl saccharine, N-ethyl saccharine, N-i/n propyl-saccharine, N-iso/normal/neo/tertiary butyl-saccharine, N-normal/iso-pentyl-saccharine, N-cyclohexyl-saccharine, N-cyclopentyl-saccharine, N-phenyl-saccharine, and N-benzyl saccharine.

9. The thermoplastic molding composition of claim 1 wherein said saccharine compound is at least one member selected from the group consisting of saccharine, N-methyl saccharine and N-benzyl saccharine.

10. The thermoplastic molding composition of claim 1 wherein said saccharine compound is at least one member selected from the group consisting of saccharine and N-methyl saccharine and N-phenyl saccharine.

* * * * *